(12) United States Patent
Pearman et al.

(10) Patent No.: US 11,964,347 B2
(45) Date of Patent: Apr. 23, 2024

(54) SAFETY PLUG FOR A FEMALE WELDING LEAD CONNECTOR

(71) Applicant: Alpha/Omega Energy Solutions, LLC, Cumberland Gap, TN (US)

(72) Inventors: Bradley Lance Pearman, Cumberland Gap, TN (US); Kenny Lavelle Miller, Madeira Beach, FL (US)

(73) Assignee: Alpha/Omega Energy Solutions, LLC, Cumberland Gap, TN (US)

( * ) Notice: Subject to any disclaimer, the term of this patent is extended or adjusted under 35 U.S.C. 154(b) by 0 days.

(21) Appl. No.: 17/709,800

(22) Filed: Mar. 31, 2022

(65) Prior Publication Data
US 2023/0311232 A1  Oct. 5, 2023

(51) Int. Cl.
*H01R 13/52* (2006.01)
*B23K 9/32* (2006.01)
*H01R 4/22* (2006.01)

(52) U.S. Cl.
CPC .............. *B23K 9/321* (2013.01); *B23K 9/323* (2013.01); *H01R 4/22* (2013.01); *H01R 13/5213* (2013.01)

(58) Field of Classification Search
CPC .................................................. H01R 13/5213
See application file for complete search history.

(56) References Cited

U.S. PATENT DOCUMENTS

| | | |
|---|---|---|
| 122,396 A | 1/1872 | McIlhenny |
| 142,388 A | 9/1873 | Goble |
| 2,518,289 A | 4/1950 | Cox |
| 2,873,357 A | 2/1959 | Landis |
| 2,980,790 A | 4/1961 | Bracken |
| 3,129,993 A * | 4/1964 | Ross ...................... H01R 13/64 439/294 |
| 3,226,667 A | 12/1965 | Senior |
| 4,300,373 A | 11/1981 | Camos |
| 4,381,063 A | 4/1983 | Leong |
| 4,421,369 A * | 12/1983 | Myking ................. H01R 24/20 439/259 |
| 4,458,923 A | 7/1984 | Burroughs |
| 4,541,256 A | 9/1985 | Green |
| 4,643,505 A | 2/1987 | House |
| 4,702,539 A | 10/1987 | Cusick |

(Continued)

FOREIGN PATENT DOCUMENTS

| | | |
|---|---|---|
| CA | 552341 | 1/1958 |
| CA | 2485302 | 6/2005 |

(Continued)

OTHER PUBLICATIONS

PCT International Search Report for PCT App. No. PCT/US2021/027685 dated May 12, 2021.

(Continued)

*Primary Examiner* — Hung V Ngo
(74) *Attorney, Agent, or Firm* — Robinson IP Law, PLLC

(57) ABSTRACT

A safety plug for a female welding lead connector configured to remain tethered to the female welding lead connector and including a male head configured in the shape of a male end of a male welding lead connector so that the male head of the safety plug can be inserted into a female welding lead connector, rotated, and secured in place inside a female welding lead connector in the same manner as a male welding lead connector.

11 Claims, 10 Drawing Sheets

(56) References Cited

U.S. PATENT DOCUMENTS

| | | | |
|---|---|---|---|
| 4,707,043 A * | 11/1987 | Reed | H01R 13/443 |
| | | | 439/282 |
| 4,826,215 A | 5/1989 | Sullivan | |
| 4,909,756 A | 3/1990 | Jervis | |
| 5,006,078 A * | 4/1991 | Crandall | H01R 13/5213 |
| | | | 439/750 |
| 5,015,013 A | 5/1991 | Nadin | |
| 5,052,939 A | 10/1991 | Koch | |
| 5,061,194 A | 10/1991 | Herman et al. | |
| 5,129,839 A | 7/1992 | Vanskiver | |
| 5,139,429 A | 8/1992 | Herman et al. | |
| 5,193,366 A | 3/1993 | Brinkman | |
| 5,217,387 A | 6/1993 | Hull et al. | |
| 5,347,084 A | 9/1994 | Roney | |
| 5,379,836 A | 1/1995 | Jordan | |
| 5,506,922 A | 4/1996 | Grois et al. | |
| 5,525,073 A | 6/1996 | Sampson | |
| 5,685,730 A | 11/1997 | Cameron | |
| 5,821,462 A | 10/1998 | Raleigh | |
| 5,844,171 A | 12/1998 | Fitzgerald | |
| 6,074,238 A | 6/2000 | DeRoss | |
| 6,099,340 A | 8/2000 | Florentine | |
| 6,149,445 A | 11/2000 | Daddono | |
| 6,171,132 B1 | 1/2001 | Schmidt | |
| 6,184,492 B1 | 2/2001 | Busopulos | |
| 6,250,946 B1 | 6/2001 | Tardy | |
| 6,280,235 B1 | 8/2001 | Radliff | |
| 6,848,926 B2 | 2/2005 | Ling | |
| 6,913,294 B2 | 7/2005 | Treverton | |
| 6,935,871 B2 | 8/2005 | Maurer | |
| 7,077,681 B2 | 7/2006 | Behoo | |
| 7,285,725 B1 | 10/2007 | Saman | |
| 7,384,297 B2 | 6/2008 | King, Jr. et al. | |
| 7,431,611 B2 | 10/2008 | King, Jr. et al. | |
| 7,442,077 B2 * | 10/2008 | Peress | H01R 13/5213 |
| | | | 439/468 |
| 7,470,858 B2 * | 12/2008 | McNutt | H01R 13/5219 |
| | | | 174/67 |
| 7,550,672 B2 | 6/2009 | Chadbourne | |
| 7,628,428 B2 | 12/2009 | Rampton | |
| 7,722,086 B2 | 5/2010 | Ishiki | |
| 8,408,929 B2 | 4/2013 | Solon | |
| 8,870,587 B2 | 10/2014 | Nooner et al. | |
| 8,875,792 B2 | 11/2014 | Whitelaw | |
| 9,211,602 B1 | 12/2015 | Carney et al. | |
| 10,056,745 B2 | 8/2018 | Nooner et al. | |
| 10,431,930 B1 | 10/2019 | Pearman | |
| 10,720,731 B2 | 7/2020 | Pearman | |
| 10,746,329 B2 | 8/2020 | Pearman | |
| 10,749,296 B2 | 8/2020 | Pearman | |
| 10,870,163 B2 | 12/2020 | Pearman | |
| 11,146,029 B1 * | 10/2021 | Shaffer | H01R 13/6395 |
| 11,177,584 B1 | 11/2021 | Pearman | |
| 2002/0092837 A1 | 7/2002 | Keats | |
| 2004/0097120 A1 | 5/2004 | Limber et al. | |
| 2004/0123997 A1 | 7/2004 | Drane et al. | |
| 2004/0144758 A1 | 7/2004 | Onishi | |
| 2005/0136716 A1 | 6/2005 | Behoo | |
| 2007/0037430 A1 | 2/2007 | Evans | |
| 2007/0072461 A1 | 3/2007 | Williams et al. | |
| 2012/0064744 A1 | 3/2012 | Messner | |
| 2013/0119041 A1 | 5/2013 | Humenik | |
| 2013/0212842 A1 | 8/2013 | Rigollet et al. | |
| 2014/0038439 A1 | 2/2014 | Lee | |
| 2014/0199878 A1 * | 7/2014 | Ihde | H01R 9/11 |
| | | | 439/367 |
| 2015/0069114 A1 | 3/2015 | Sunger et al. | |
| 2015/0277061 A1 * | 10/2015 | Pagot | G02B 6/3849 |
| | | | 156/60 |
| 2015/0325940 A1 | 11/2015 | Foseide | |
| 2015/0354730 A1 | 12/2015 | Plunkett | |
| 2016/0024818 A1 | 1/2016 | Allen | |
| 2017/0087658 A1 | 3/2017 | Townsend | |
| 2017/0110831 A1 | 4/2017 | Su | |
| 2017/0212308 A1 * | 7/2017 | Koch | H01R 13/622 |
| 2018/0166871 A1 | 6/2018 | Nooner et al. | |
| 2018/0368536 A1 | 12/2018 | Newson | |
| 2020/0141524 A1 | 5/2020 | Pearman | |
| 2020/0144767 A1 | 5/2020 | Pearman | |
| 2020/0144768 A1 | 5/2020 | Pearman | |
| 2020/0198485 A1 | 6/2020 | Schwan | |
| 2021/0344136 A1 * | 11/2021 | Kanamori | H01R 13/506 |
| 2022/0181820 A1 * | 6/2022 | Nook | H01R 24/22 |

FOREIGN PATENT DOCUMENTS

| | | |
|---|---|---|
| EP | 0918590 | 12/2002 |
| GB | 907905 | 10/1962 |
| GB | 931500 | 7/1963 |
| GB | 1327584 | 8/1973 |
| WO | 9749519 | 12/1997 |
| WO | 2015047552 | 4/2015 |

OTHER PUBLICATIONS

Written Opinion of the International Searching Authority for PCT App. No. PCT/US2021/027685 dated May 12, 2021.
Spec Sheet for Eureka HD Series Pin and Sleeve Electrical Connector available at the URL https://www.elecdirect.com/media/specsheets/100-Amp-Pin-And-Sleeve-Connectors-Watertight.pdf.
Office Action dated Apr. 21, 2021, U.S. Appl. No. 17/190,636.
Office Action dated Jul. 8, 2021, U.S. Appl. No. 17/190,636.
Office Action dated Aug. 19, 2021, U.S. Appl. No. 17/190,636.
Office Action dated Oct. 2, 2019, U.S. Appl. No. 16/180,540.
Office Action dated Jan. 17, 2020, U.S. Appl. No. 16/561,854.
Office Action dated Jan. 17, 2020, U.S. Appl. No. 16/588,136.
PCT International Search Report for PCT App. No. PCT/US2019/059339 dated Jan. 21, 2020.
PCT International Search Report for PCT App. No. PCT/US2019/059341 dated Jan. 21, 2020.

* cited by examiner

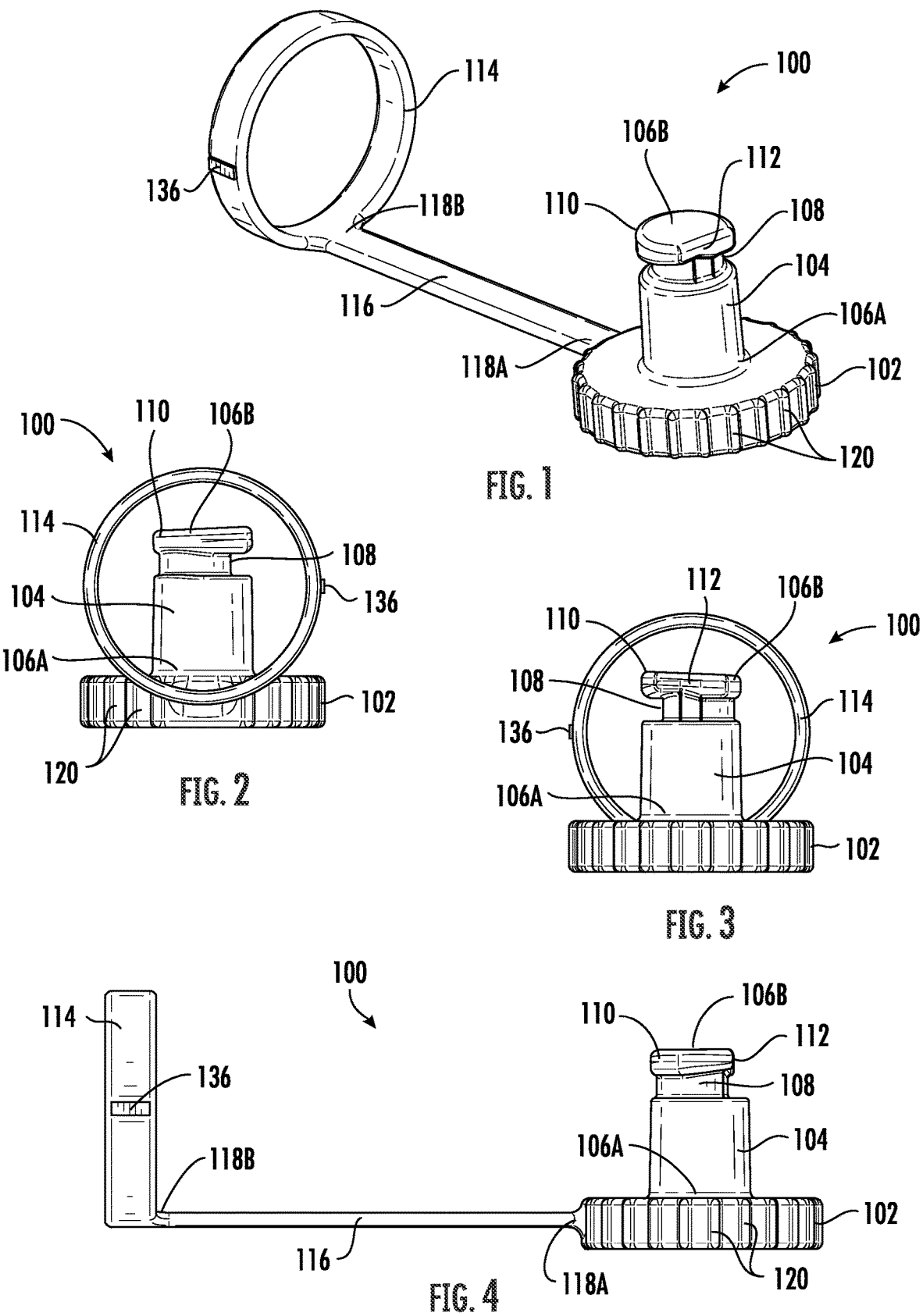

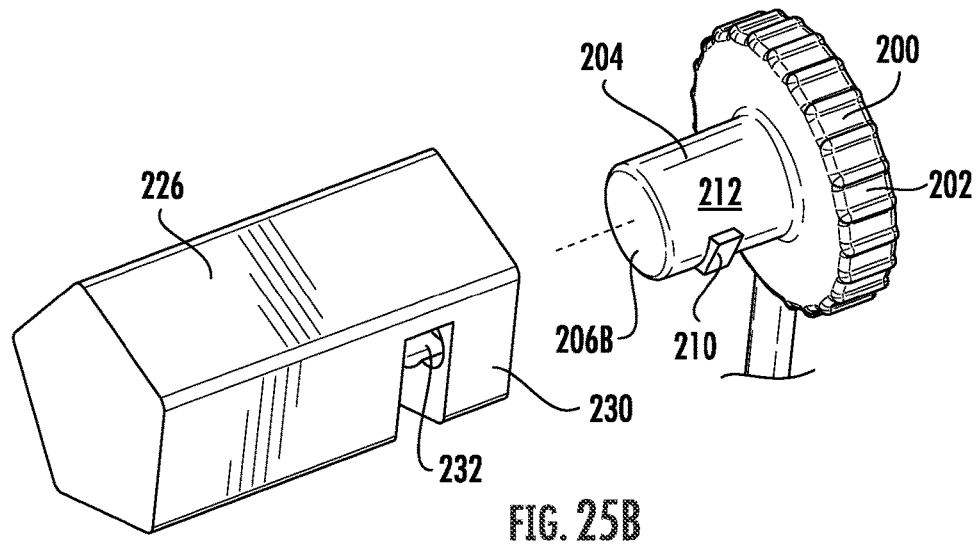
FIG. 25B
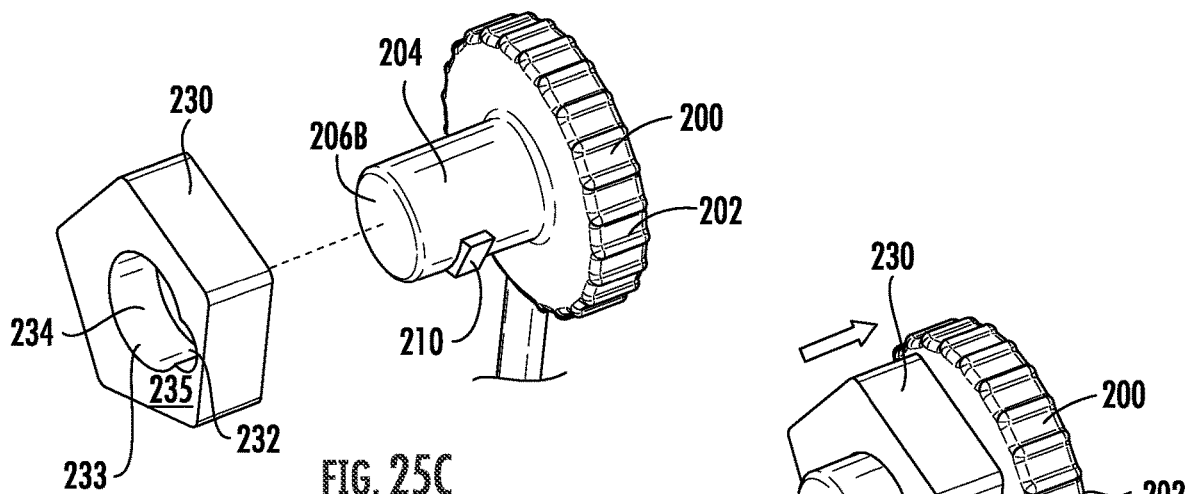
FIG. 25C
FIG. 25D
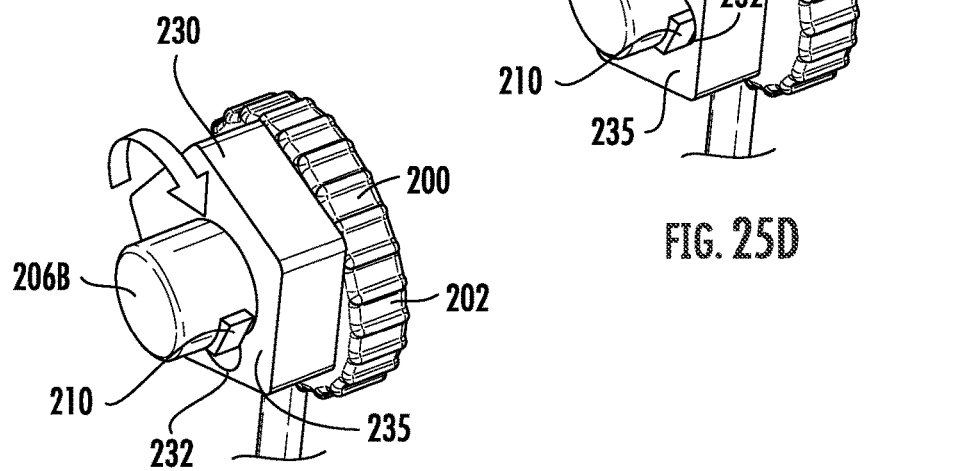
FIG. 25E

SAFETY PLUG FOR A FEMALE WELDING LEAD CONNECTOR

FIELD

This disclosure relates to the field of welding. More particularly, this disclosure relates to a safety plug for female welding lead connectors.

BACKGROUND

Welding leads (or "welding cable") is an electrical conductor for transmitting a welding current used for welding materials together (e.g., for arc welding or resistance welding). Welding leads typically include small copper strands wrapped together inside a nonconductive outer layer. Such leads typically have enlarged ends in the form of cable connectors wherein one end is typically a male end and the other a female end with both male and female features being highly conductive.

Welding leads can be both dangerous and expensive. Some dangers include potential electrocution if the connection between a first welding lead cable connector connected to a second welding leads cable connector becomes loose and conductive material is exposed outside or otherwise being the nonconductive outer layer of the welding leads. Unconnected welding lead connectors that are open and exposed can be particularly dangerous if the welding lead is energized with current flowing through the welding lead. Usually, female welding lead connectors are the welding lead connectors that provide power for welding. Therefore, female welding lead connectors pose the most risk of electrocution or electrical arcing.

What is needed, therefore, is device and method to overcome the issues mentioned above related to common welding leads.

SUMMARY

The above and other needs are met by a safety plug apparatus for use with a female welding lead connector, the safety plug apparatus comprising: a cap member; and a male head member attached to and extending orthogonally from the cap member wherein the male head member includes: a male head member proximal end where the male head member is attached to the cap member; a male head member distal end; an annular channel around the male head member located proximate to the male head member distal end; and an annular ring along the male head member distal end, the annular ring including a flat edge along a portion of the annular ring, wherein the male head member is configured to be inserted into a female welding lead connector, rotated inside a female welding lead connector, and secured in place inside a female welding lead connector.

The safety plug preferably further includes a collar configured to fit tightly around an outer surface of a female welding lead connector; and a tether attached to and extending from the collar to the cap member wherein the tether is attached to the cap member.

In some embodiments, the male head member, the tether, and the collar comprise a unitary apparatus made of plastic.

In embodiments, the cap member further comprises an outer rim comprising a plurality of raised ridges to facilitate the twisting the member cap when the male head member is inserted into a female welding lead connector.

In another aspect a safety plug apparatus for use with a female welding lead connector is disclosed, the safety plug apparatus comprising a cap member; and a male head member attached to and extending orthogonally from the cap member wherein the male head member includes: a male head member proximal end where the male head member is attached to the cap member; a male head member distal end; a protrusion extending out laterally from the male head member along an outer surface of the male head member; wherein the male head member is configured to be inserted into a female welding lead connector, rotated inside a female welding lead connector, and secured in place inside a female welding lead connector.

The safety plug apparatus may further comprise a collar configured to fit tightly around an outer surface of a female welding lead connector; and a tether attached to and extending from the collar to the cap member wherein the tether is attached to the cap member.

In some embodiments, the cap, the male head member, the tether, and the collar comprise a unitary apparatus made of plastic.

In some embodiments, the cap member further comprises an outer rim comprising a plurality of raised ridges to facilitate the twisting the member cap when the male head member is inserted into a female welding lead connector.

In another aspect, a kit of a plurality of safety plug apparatuses is disclosed, wherein the kit includes multiple safety plug apparatuses identical to some or all of the embodiments described above. Preferably, the kit includes a first safety plug apparatus of a first color; a second safety plug apparatus of a second color; and a third safety plug apparatus of a third color.

In another aspect, a method is disclosed for securing a safety plug apparatus to a female welding lead connector, the method comprising: inserting the male head member of the safety plug apparatus into a receptacle of a female welding lead connector; and twisting the safety plug apparatus relative to the female welding lead connector to secure the safety plug apparatus to the female welding lead connector. The method may use any of the embodiments or variations thereof of apparatuses described herein.

The summary provided herein is intended to provide examples of particular disclosed embodiments and is not intended to cover all potential embodiments or combinations of embodiments. Therefore, this summary is not intended to limit the scope of the invention disclosure in any way, a function which is reserved for the appended claims.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

FIG. 1 shows an embodiment of a safety plug apparatus for plugging a female welding lead connector;

FIG. 2 shows a first end view of the safety plug apparatus shown in FIG. 1;

FIG. 3 shows a second end view of the safety plug apparatus shown in FIG. 1 and FIG. 2;

FIG. 4 shows a first side view of the safety plug apparatus shown in FIGS. 1-3;

FIG. 25B shows a perspective view of a male head member of the safety plug apparatus shown in FIGS. 17-23 being aligned the insert shown in FIG. 25A;

FIG. 25C shows a slice of the female welding lead connector insert shown in FIG. 25A (a proximal end of the insert shown in FIG. 25A) being aligned with the male head member of the safety plug apparatus shown in FIGS. 17-23;

FIG. 25D shows a side perspective view of the male head member of the safety plug apparatus shown in FIGS. 17-23 being inserted into a central aperture of the slice of the female welding lead connector insert shown in FIG. 25A with a protrusion of the male head member sliding through an indentation along an inner edge of the slice of the insert; and FIG. 25E shows a side perspective view of the slice of the female welding lead connector insert (and, therefore, the insert itself) shown in FIG. 25A being rotated relative to male head member of the safety plug apparatus shown in FIGS. 17-23 with the protrusion of the male head member being blocked by a back surface of the slice of the female welding lead connector insert.

Figure 5:
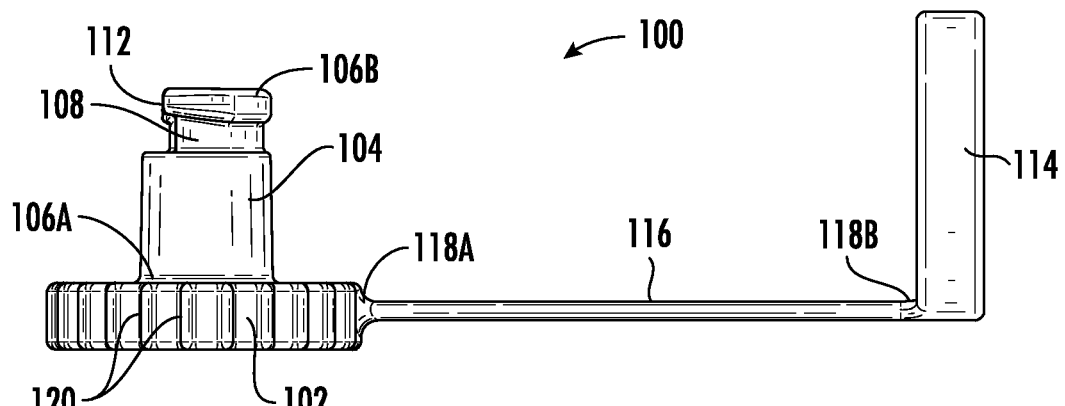
FIG. 5 shows a second side view of the safety plug apparatus shown in FIGS. 1-4.
Figure 6:
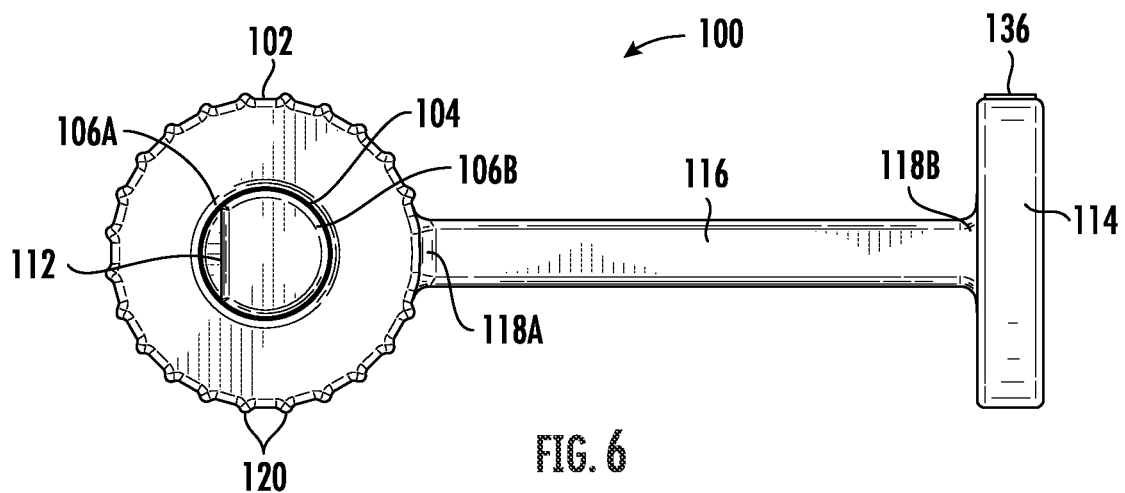
FIG. 6 shows a top view of the safety plug apparatus shown in FIGS. 1-5.
Figure 7:
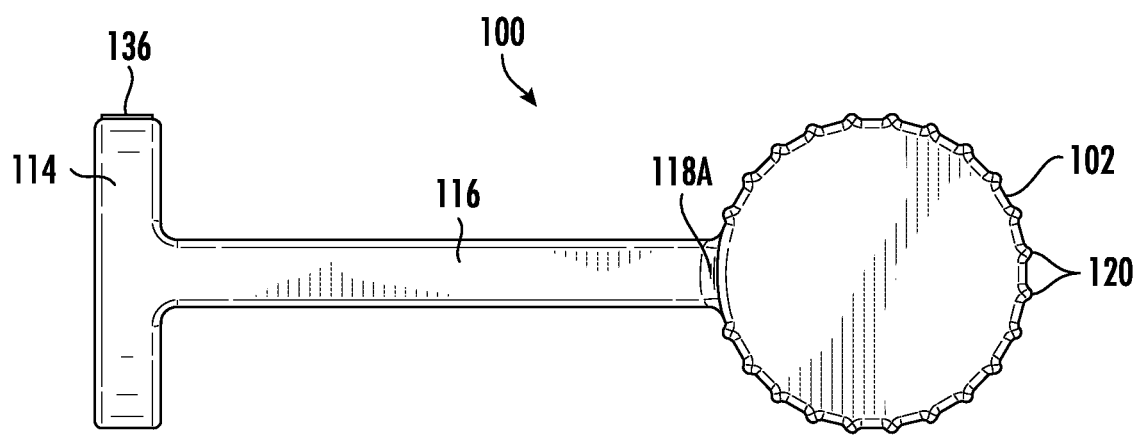
FIG. 7 shows a bottom view of the safety plug apparatus shown in FIGS. 1-6.
Figure 8:
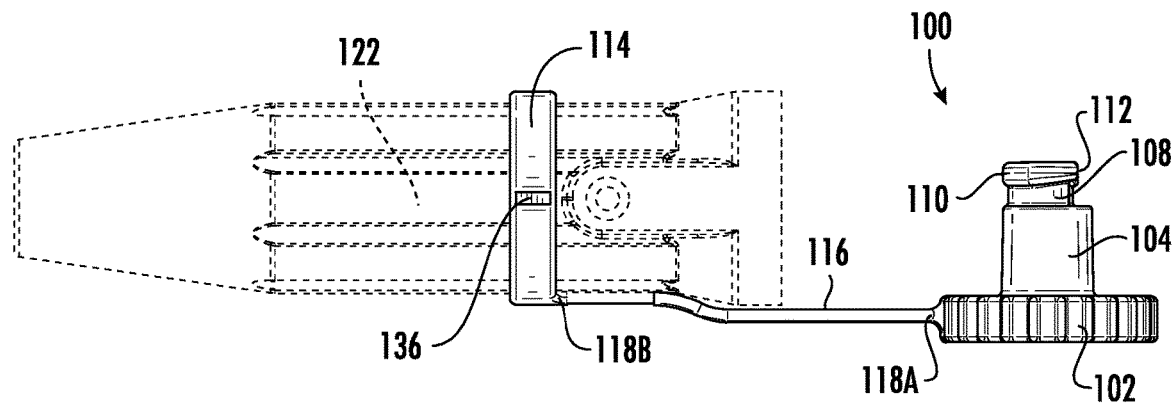
FIG. 8 shows a side view of the safety plug apparatus shown in FIGS. 1-7 including a collar attached to a female welding lead connector in an unplugged configuration.
Figure 9:
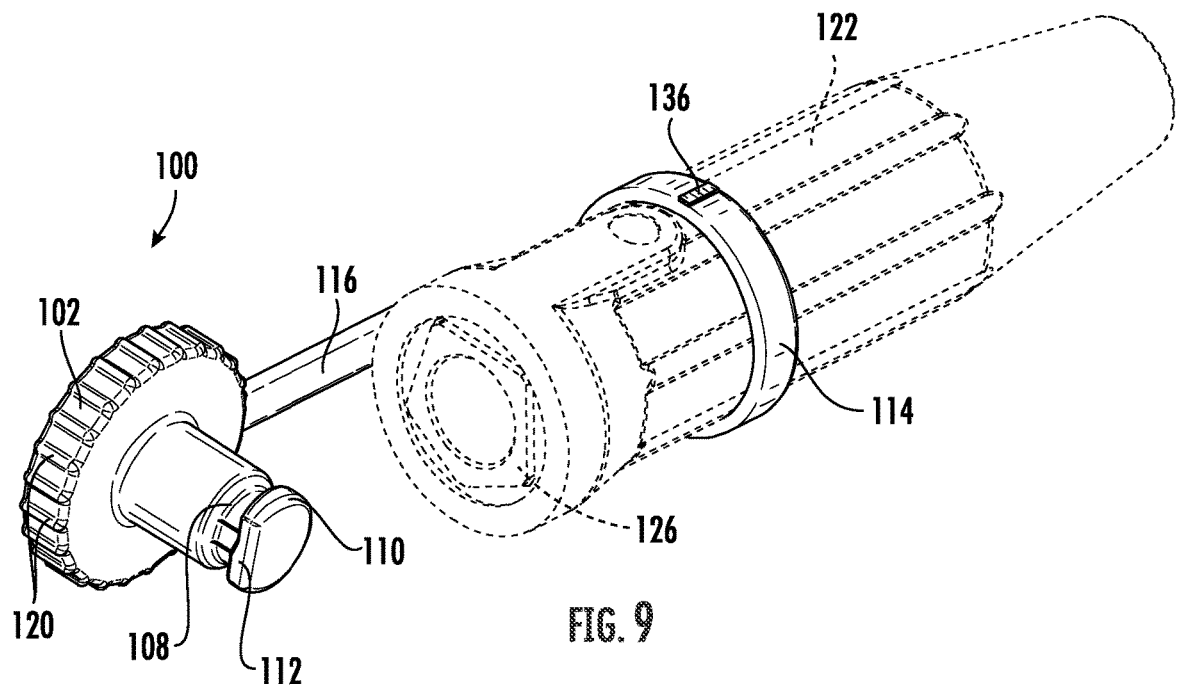
FIG. 9 shows a perspective view of the safety plug apparatus shown in FIGS. 1-8 including the collar attached to a female welding lead connector in the unplugged configuration.
Figure 10:
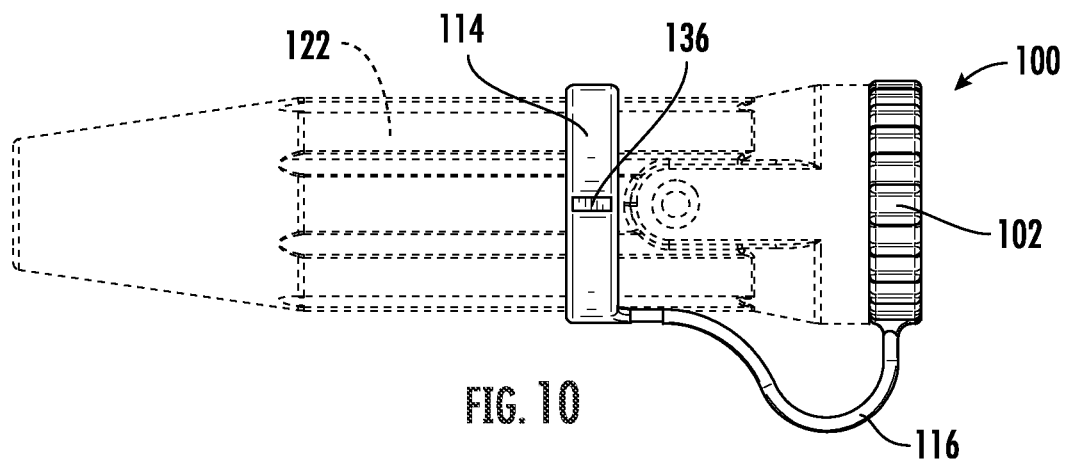
FIG. 10 shows a side view of the safety plug apparatus shown in FIGS. 1-9 including the collar attached to a female welding lead connector in a plugged configuration.
Figure 11:
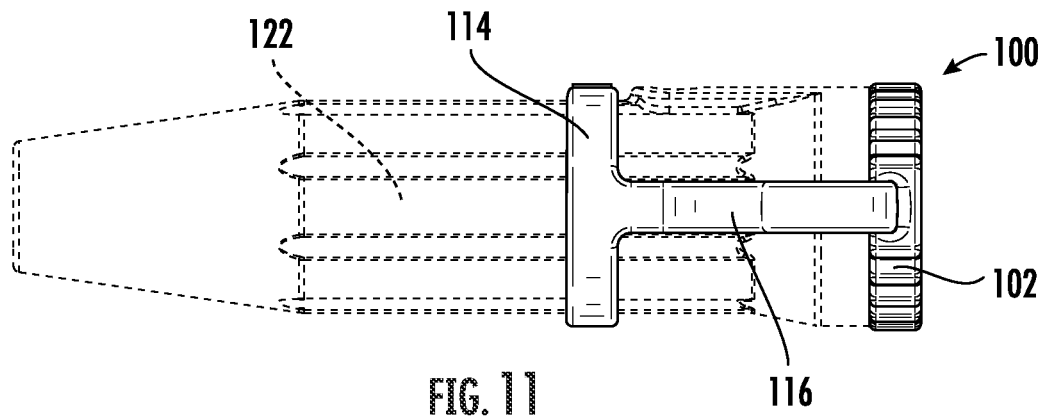
FIG. 11 shows a bottom view of the safety plug apparatus shown in FIGS. 1-10 including the collar attached to a female welding lead connector in a plugged configuration.
Figure 12:
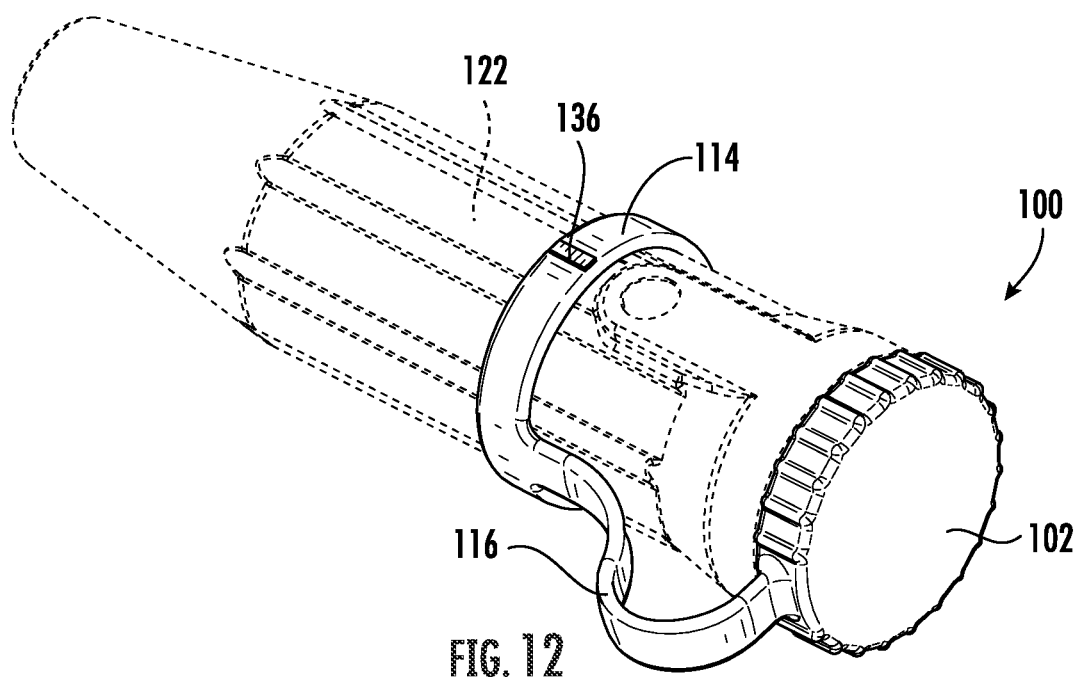
FIG. 12 Shows a perspective view of the safety plug apparatus shown in FIGS. 1-11 including the collar attached to a female welding lead connector in a plugged configuration.

The figures are provided to illustrate concepts of the invention disclosure and are not intended to embody all potential embodiments of the invention. Therefore, the figures are not intended to limit the scope of the invention disclosure in any way, a function which is reserved for the appended claims.

DETAILED DESCRIPTION

A detailed description of specific embodiments of safety plug apparatuses are described below and shown in the accompanying figures.

FIGS. 1-12 and 16A-16C show an embodiment of a safety plug apparatus 100 for a female welding lead connector. The safety plug apparatus 100 includes a cap member 102 and a male head member 104 attached to and extending orthogonally from the cap member 102. The cap member 102 is preferably in the shape of a substantially flat disk and the male head member 104 is in the shape of a connection end of a male welding lead connector. More specifically, the male head member 104 preferably further comprises a male head member proximal end 106A where the male head member 104 is attached to the cap member 102; a male head member distal end 106B; an annular channel 108 around the male head member 104 located proximate to the male head member distal end 106B; and an annular ring 110 along the male head member distal end 106B, the annular ring 110 including a flat edge 112 along a portion of the annular ring 110. The purpose of these features and their associated shapes is to mimic the shape of a connection end of a male welding lead connector so that the male head member 104 of the safety plug apparatus 100 and be inserted into a female welding lead connector and then rotated to secure the safety plug apparatus 100 to the female welding lead connector to minimize electrocution risk and prevent electrical arcing.

The safety plug apparatus 100 preferably further includes a collar 114 configured to fit tightly around an outer surface of a female welding lead connector, and a tether 116 extending from the collar 114 to the cap member 102. A tether first end 118A is attached to the cap member 102 and a tether second end 118B is attached to the collar 114. The cap member 102 preferably includes a plurality of ridges 120 to help twist the cap member 102 relative to a female welding lead connector.

Figure 13:
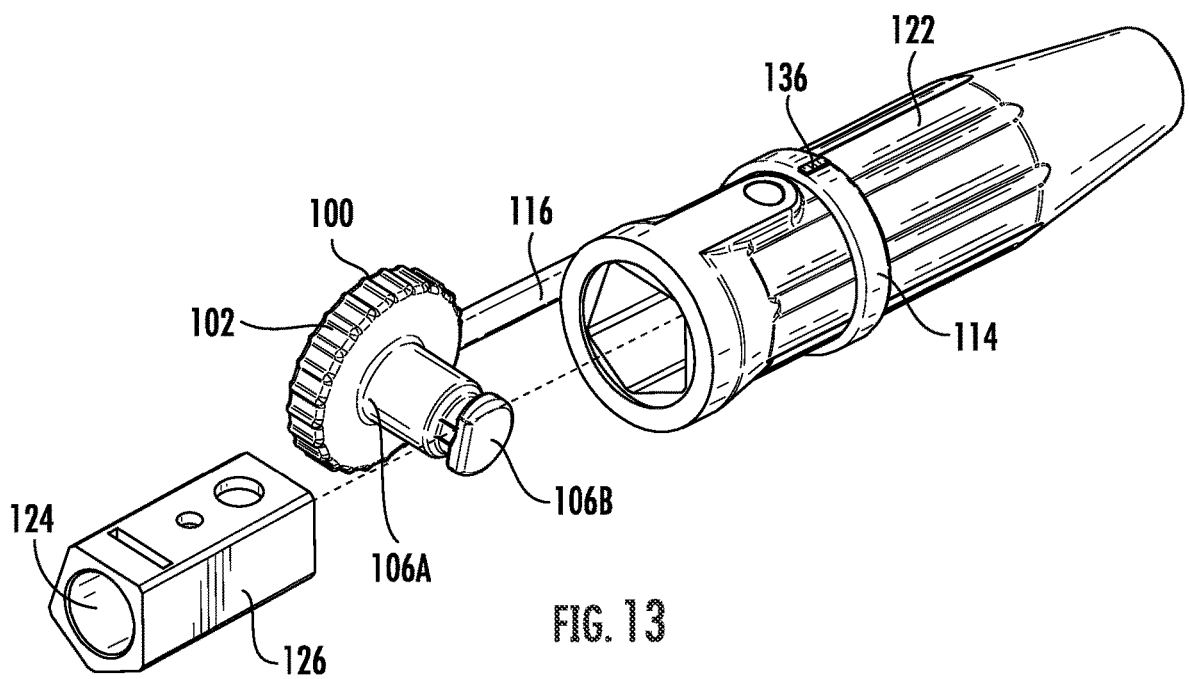
FIG. 13 shows a perspective view of the safety plug apparatus shown in FIGS. 1-9 including the collar attached to a partially exploded view of a female welding lead connector in an unplugged configuration and showing a female welding lead connector insert separated from a female welding lead connector shell.
Figure 14:
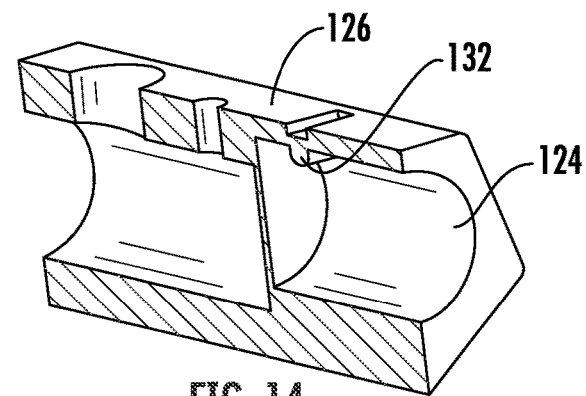
FIG. 14 shows a cross-sectional view of the female welding connector insert shown in FIG. 10.
Figure 15:
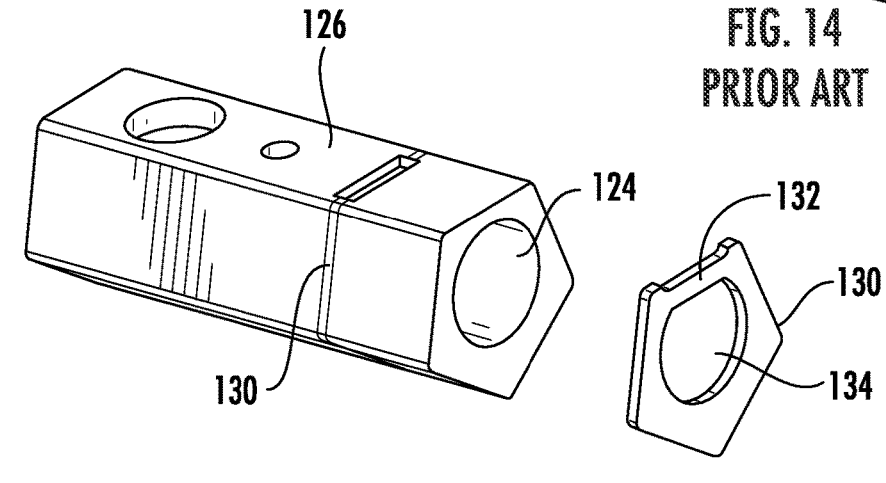
FIG. 15 shows the female welding lead connector insert shown in FIG. 13 and FIG. 14, further highlighting a specific slice of the female welding lead connector insert wherein the highlighted slice is shown by itself to the right of the image of the insert.
Figure 16A:
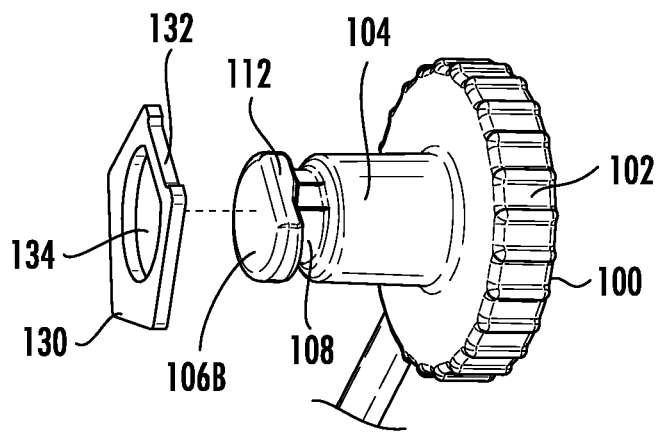
FIG. 16A shows a side perspective view of a male head member of the safety plug apparatus shown in FIGS. 1-9 being aligned with the slice representing a section of the female welding lead connector insert.
Figure 16B:
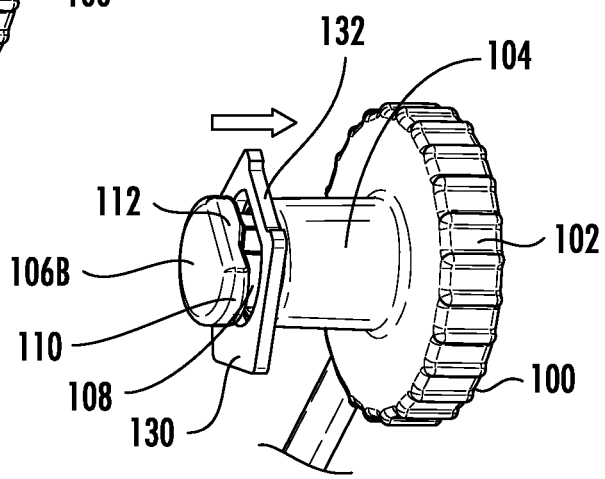
FIG. 16B shows a side perspective view of a male head member of the safety plug apparatus shown in FIGS. 1-9 being further inserted through the slice representing a section of the female welding lead connector insert with the slice being positioned along an annular channel of the male head member.
Figure 16C:
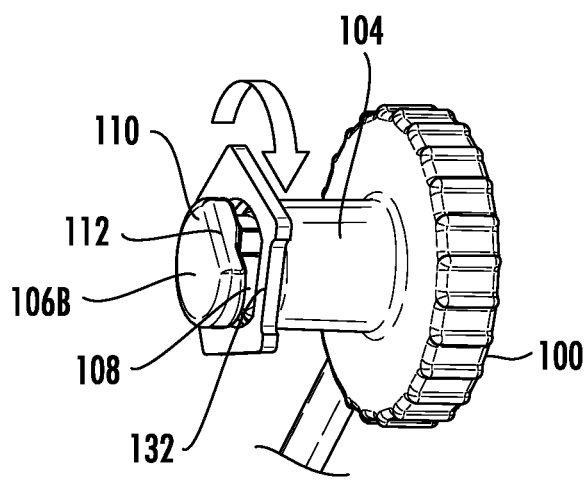
FIG. 16C shows a side perspective view of the slice of the female welding lead connector insert (and, therefore, the insert itself) being rotated relative to male head member of the safety plug apparatus shown in FIGS. 1-9 with a flat inner edge of the slice being located along the annular channel of the male head member and blocked by an annular ring along a distal end of the male head member.
Figure 17:
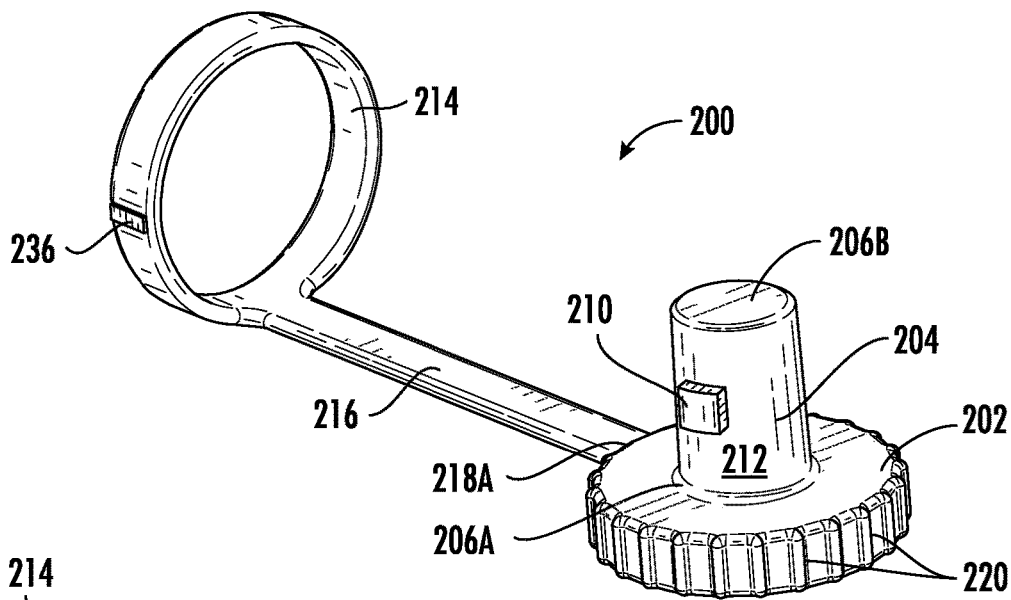
FIG. 17 shows a second embodiment of a safety plug apparatus for plugging a female welding lead connector.
Figure 18:
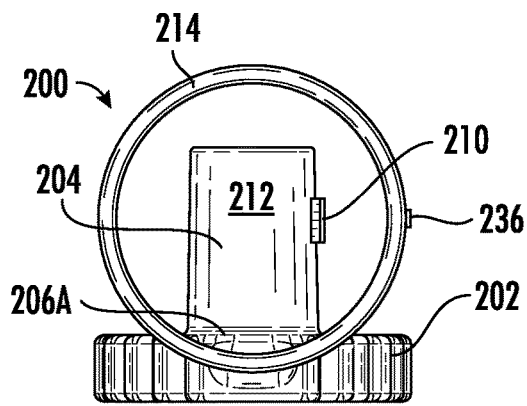
FIG. 18 shows a first end view of the safety plug apparatus shown in FIG. 17.
Figure 19:
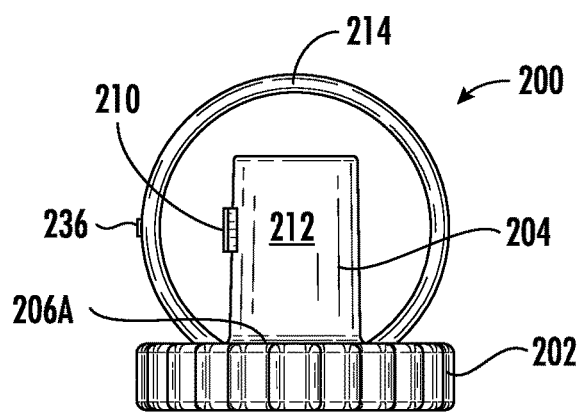
FIG. 19 shows a second end view of the safety plug apparatus shown in FIG. 17 and FIG. 18.
Figure 20:
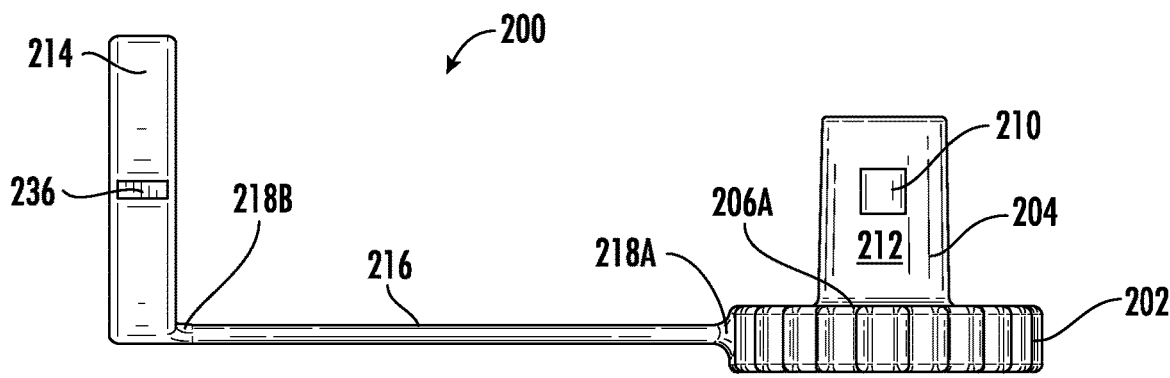
FIG. 20 shows a first side view of the safety plug apparatus shown in FIGS. 17-19.
Figure 21:
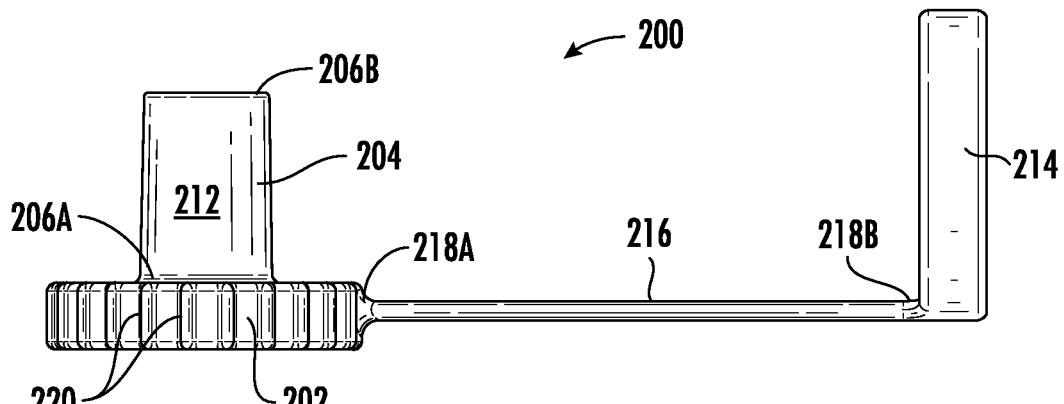
FIG. 21 shows a second side view of the safety plug apparatus shown in FIGS. 17-20.
Figure 22:
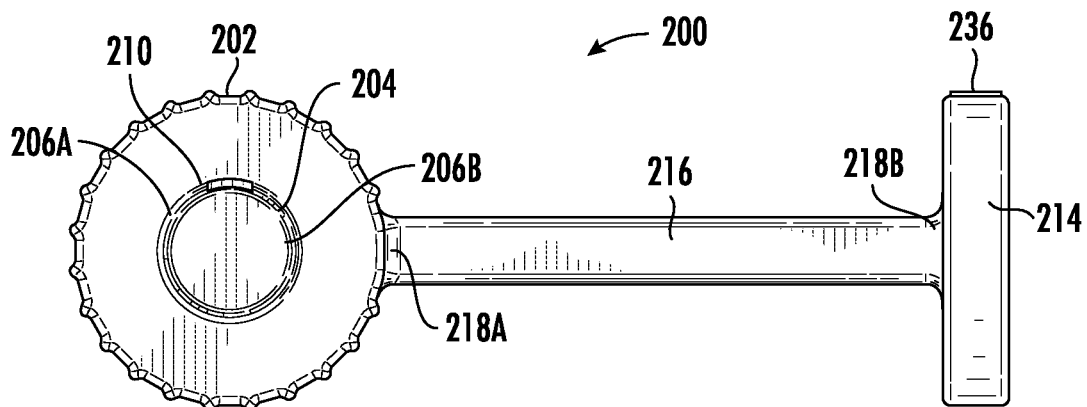
FIG. 22 shows a top view of the safety plug apparatus shown in FIGS. 17-21.
Figure 23:
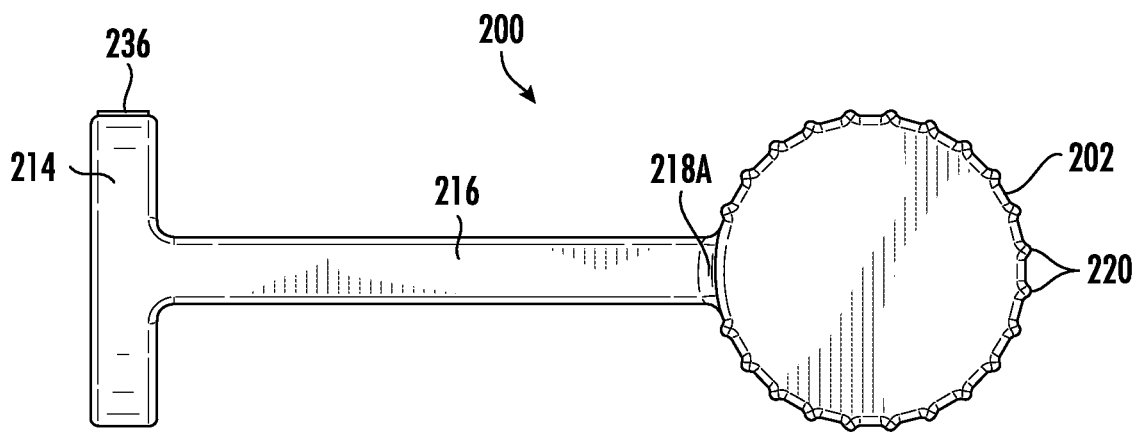
FIG. 23 shows a bottom view of the safety plug apparatus shown in FIGS. 17-22.

For use of the safety plug apparatus 100 described herein, the collar 114 is slid onto a female welding lead connector 122 as shown in FIGS. 8-13. The male head member 104 is then inserted into a female welding lead receptacle 124 of the female welding lead connector 122. The safety plug apparatus 100 is then twisted relative to the female welding lead connector 122 to engage the male head member 104 inside the female welding lead receptacle 124. FIG. 13 shows a partially exploded view of the female welding lead connector 122 showing a common welding lead connector insert 126 separated from a shell 128 of the female welding lead connector 122. The insert 126 is shown in FIG. 14 and FIG. 15. FIG. 14 shows a lengthwise cross-sectional view of the insert 126. In FIG. 15, a specific slice 128 of the insert 126 is highlighted and shown by itself. The slice 128 includes a flat edge 132 and a central aperture 134 into which the male head member 104 may be inserted. FIGS. 16A-16C show how the male head member 104 engages with the insert 126 inside the female welding lead connector 122. When the distal end 106B of the male head member 104 is inserted through the central aperture 134 as shown in FIG. 16B, the flat edge 112 along the distal end 106B of the male head member 104 coincides with the flat edge 132 of the slice 130, thereby permitting the annular ring 110 through the central aperture 134. When the safety plug apparatus 100 is twisted relative to the female welding lead connector 122 as shown in FIG. 16C, the flat edge 132 of the slice 130 is rotated into the annular channel 108 such that the male head member 104 is prevented from escaping the female welding lead receptacle 124 by the annular ring 110. A collar indicator 136 is preferably located on the collar 114 to help visually align the safety plug apparatus 100 with the female welding lead connector 122. The collar indicator 136 may be a visual mark, a small hump, a notch, or any other similar feature to operate as an indicator of the relative position of the safety plug apparatus 100 male head member 104 and the female welding lead connector.

In another aspect, a safety plug apparatus 200 is disclosed and shown in FIGS. 17-23, the safety plug apparatus 200 including a cap member 202, a male head member 204 including a male head member proximal end 206A and a male head member distal end 206B, a protrusion 210 extending out laterally from an outer surface 212 of the male head member 204, a collar 214, and a tether 216 connecting the cap member 202 with the collar 214. The tether 216 includes a tether first end 218A connected to the cap member 202 and a tether second end 218B connected to the collar 214. The cap member 202 preferably includes a plurality of small ridges 220 to help twist the cap member 202 relative to a female welding lead connector.

Figure 24:
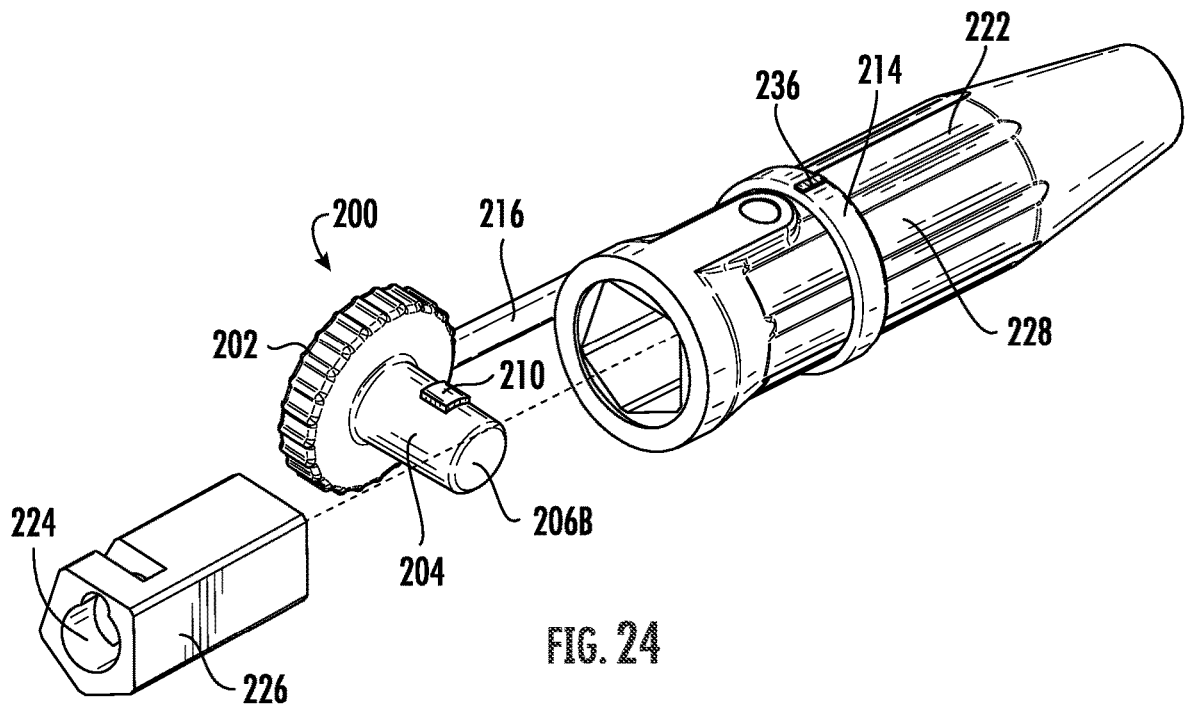
FIG. 24 shows a perspective view of the safety plug apparatus shown in FIGS. 17-23 including a collar attached to a partially exploded view of a female welding lead connector in an unplugged configuration and showing a female welding lead connector insert separated from a female welding lead connector shell.
Figure 25A:
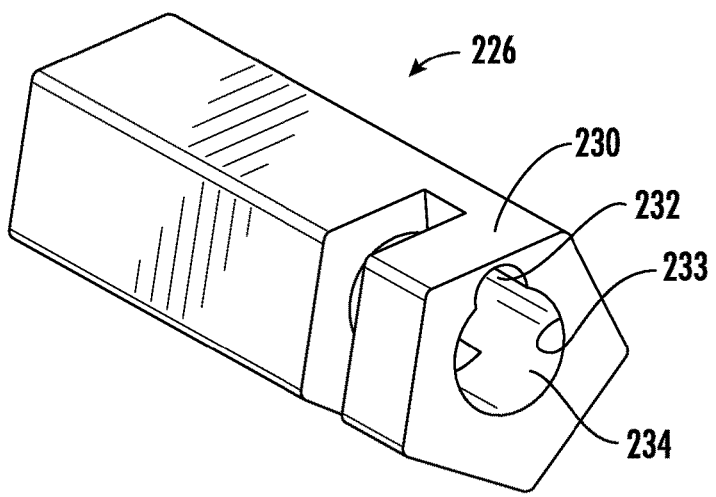
FIG. 25A shows a perspective view of the female welding lead connector insert shown in FIG. 24.

For use of the safety plug apparatus 200 described herein, the collar 214 is slid onto a female welding lead connector 222 as shown in FIG. 24. The male head member 204 is then inserted into a female welding lead receptacle 224 of the female welding lead connector 222. The safety plug apparatus 200 is then twisted relative to the female welding lead connector 222 to engage the male head member 204 inside the female welding lead receptacle 224. FIG. 24 shows a partially exploded view of the female welding lead connector 222 showing a common welding lead connector insert 226 separated from a shell 228 of the female welding lead connector 222. The insert 226 is shown in FIG. 25A. FIG. 25B shows the insert 226 lined up with the male head member 204 of the safety plug apparatus 200. In FIG. 25C, a specific slice 230 located along a proximal end 231 of the insert 226 is shown by itself. The slice 230 includes an indentation 232 along an inner edge 233 of the slice wherein the inner edge 233 more broadly defines a central aperture 234. The male head member 204 may be inserted into the central aperture 234 with the protrusion 210 passing through the indentation 232 as shown in FIGS. 25C-25E. When the distal end 206B of the male head member 204 is inserted through the central aperture 234 as shown in FIG. 19D, the protrusion 210 along the outer surface 212 of the male head member 204 coincides with the indentation 232, thereby permitting the distal end 206B of the male head member 204 through the central aperture 234 and associated indentation 232. When the safety plug apparatus 200 is twisted relative to the female welding lead connector 222 as shown in FIG. 25E, the protrusion 210 slides past the indentation 232 along a back surface 235 of the slice 230, thereby preventing the male head member 204 form disengaging from the female welding lead receptacle 224. A collar indicator 236 is preferably located on the collar 214 to help visually align the safety plug apparatus 200 with the female welding lead connector 222. The collar indicator 236 may be a visual mark, a small hump, a notch, or any other similar feature to operate as an indicator of the relative position of the safety plug apparatus 200 male head member 204 and the female welding lead connector.

The safety plug apparatus 100 and the safety plug apparatus 200 are preferably made of nonconductive material such as plastic or rubber. Although these materials are preferred, any nonconductive material that can maintain a substantially rigid shape can be used.

In addition to the safety plug apparatus 100 and the safety plug apparatus 200 described above, a kit is disclosed which includes a plurality of safety plug apparatuses identical or substantially the same as the safety plug apparatus 100 or the safety plug apparatus 200 described above. The kit preferably includes at least three safety plug apparatuses (and preferably more) wherein each safety plug apparatus is a different color. By using the kit of different-colored safety plug apparatuses, persons using a large number of welding leads on a single project can easily visually distinguish between the different welding leads being used and, thereby, more quickly identify each individual welding lead and the apparatus(es) to which that particular welding lead is electrically tied.

In addition to the embodiments of the apparatuses described herein, a method is disclosed for securing a plug to a female welding lead connector. In a first aspect, a method includes inserting the male head member 104 of the safety plug apparatus 100 into a receptacle 124 of a female welding lead connector 122 as shown in FIGS. 16A and 16B, and twisting the male head member 104 relative to the female welding lead connector 122 as shown in FIG. 16C to secure the mail head member 104 of the safety plug apparatus 100 inside the female welding lead connector 122. The method may further include a prior step of attaching the safety plug apparatus 100 to the shell 128 of the female welding connector 122 by sliding the collar 114 onto the shell 128 of the female welding lead connector 122 as shown, for example, in FIGS. 8-13.

In second aspect, a method includes inserting the male head member 204 of the safety plug apparatus 200 into a receptacle 224 of a female welding lead connector 222 as shown in FIGS. 25C and 25D, and twisting the male head member 204 relative to the female welding lead connector 222 as shown in FIG. 25E to secure the mail head member 204 of the safety plug apparatus 200 inside the female welding lead connector 222. The method may further include a prior step of attaching the safety plug apparatus 200 to the shell 228 of the female welding connector 222 by sliding the collar 214 onto the shell 228 of the female welding lead connector 222 as shown, for example, in FIG. 24.

The previously described embodiments of the present disclosure have many advantages, including providing a safety plug apparatus to plug female welding lead connectors to prevent electrical arcing and minimize electrocution risk when the female welding lead connectors are not being used. Additionally, because of the unique shape of the male head member, the male head member can be twisted and secured inside a female welding lead connector which prevents the safety plug apparatus from being disengaged with the female welding lead connector by direct pulling. In order to be disengaged, the safety plug apparatus must be twisted again and then pulled from the female welding lead connector. Another benefit of the safety plug apparatus is the fact that it can be tethered to a female welding lead connector when the safety plug apparatus is not in use.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

Any element in a claim that does not explicitly state "means for" performing a specified function, or "step for" performing a specific function, is not to be interpreted as a "means" or "step" clause as specified in 35 U.S.C. § 112, ¶6. In particular, the use of "step of" in the claims herein is not intended to invoke the provisions of 35 U.S.C. § 112, ¶6.

What is claimed is:

1. A safety plug apparatus for use with a female welding lead connector, the safety plug apparatus comprising:
    a cap member having a first side and a closed second side opposite and spaced apart from the first side; and
    a male head member attached to and extending orthogonally from the first side of the cap member wherein the male head member includes:
        a male head member proximal end where the male head member is attached to the cap member;
        a male head member distal end;
        an annular channel around the male head member located proximate to the male head member distal end; and
        an annular ring along the male head member distal end, the annular ring including a flat edge along a portion of the annular ring;
    wherein the male head member is configured to be inserted into a female welding lead connector, rotated inside the female welding lead connector, and secured in place inside the female welding lead connector, and wherein the cap and the male head member comprise a unitary apparatus made of a nonconductive material.

2. The safety plug apparatus of claim 1 further comprising:
    a collar configured to fit tightly around an outer surface of a female welding lead connector; and
    a tether attached to and extending from the collar to the cap member wherein the tether is attached to the cap member.

3. The safety plug apparatus if claim 2 wherein the cap, the male head member, the tether, and the collar comprise a unitary apparatus made of plastic.

4. The safety plug apparatus if claim 2 wherein the cap member further comprises an outer rim comprising a plurality of raised ridges to facilitate the twisting the member cap when the male head member is inserted into a female welding lead connector.

5. A kit of a plurality of safety plug apparatuses, each identical to the safety plug apparatus of claim 1, the kit comprising:
    a first safety plug apparatus of a first color;
    a second safety plug apparatus of a second color; and
    a third safety plug apparatus of a third color.

6. A method of securing a safety plug apparatus of claim 1 to a female welding lead connector, the method comprising:
    inserting the male head member of the safety plug apparatus into a receptacle of a female welding lead connector; and
    twisting the safety plug apparatus relative to the female welding lead connector to secure the safety plug apparatus to the female welding lead connector.

7. A safety plug apparatus for use with a female welding lead connector, the safety plug apparatus comprising:
    a cap member;
    a male head member attached to and extending orthogonally from the cap member wherein the male head member includes:
        a male head member proximal end where the male head member is attached to the cap member;
        a male head member distal end;
        a protrusion extending out laterally from the male head member along an outer surface of the male head member;
    a collar configured to fit tightly around an outer surface of a female welding lead connector, wherein the collar includes a collar indicator disposed along the collar to indicate the relative rotational position of the male head member; and
    a tether attached to and extending from the collar to the cap member, wherein the tether is attached to the cap member, and
    wherein the male head member is configured to be inserted into a female welding lead connector, rotated inside a female welding lead connector, and secured in place inside a female welding lead connector.

8. The safety plug apparatus if claim 7 wherein the cap, the male head member, the tether, and the collar comprise a unitary apparatus made of plastic.

9. The safety plug apparatus if claim 7 wherein the cap member further comprises an outer rim comprising a plurality of raised ridges to facilitate the twisting the member cap when the male head member is inserted into a female welding lead connector.

10. A kit of a plurality of safety plug apparatuses, each identical to the safety plug apparatus of claim 7, the kit comprising:
- a first safety plug apparatus of a first color;
- a second safety plug apparatus of a second color; and
- a third safety plug apparatus of a third color.

11. A method of securing a safety plug apparatus of claim 7 to a female welding lead connector, the method comprising:
- inserting the male head member of the safety plug apparatus into a receptacle of a female welding lead connector; and
- twisting the safety plug apparatus relative to the female welding lead connector to secure the safety plug apparatus to the female welding lead connector.

* * * * *